(12) United States Patent
Dyer et al.

(10) Patent No.: US 9,791,587 B2
(45) Date of Patent: Oct. 17, 2017

(54) APPARATUS, METHODS AND SYSTEMS FOR DOWNHOLE TESTING OF ELECTRONIC EQUIPMENT

(71) Applicant: SCHLUMBERGER TECHNOLOGY CORPORATION, Sugar Land, TX (US)

(72) Inventors: Stephen Dyer, Rosharon, TX (US); Yann Dufour, Clamart (FR); Reza Teherian, Al-Khobar (SA)

(73) Assignee: SCHLUMBERGER TECHNOLOGY CORPORATION, Sugar Land, TN (US)

(*) Notice: Subject to any disclaimer, the term of this patent is extended or adjusted under 35 U.S.C. 154(b) by 134 days.

(21) Appl. No.: 14/593,793

(22) Filed: Jan. 9, 2015

(65) Prior Publication Data

US 2016/0202383 A1    Jul. 14, 2016

(51) Int. Cl.
| | |
|---|---|
| *E21B 47/12* | (2012.01) |
| *G01V 3/28* | (2006.01) |
| *G01V 3/24* | (2006.01) |
| *E21B 47/00* | (2012.01) |
| *E21B 47/01* | (2012.01) |

(52) U.S. Cl.
CPC ............... *G01V 3/28* (2013.01); *E21B 47/00* (2013.01); *E21B 47/01* (2013.01); *E21B 47/122* (2013.01); *G01V 3/24* (2013.01)

(58) Field of Classification Search
CPC ................................ E21B 47/122; G01V 3/28
See application file for complete search history.

(56) References Cited

U.S. PATENT DOCUMENTS

| | | | |
|---|---|---|---|
| 4,842,064 A | 6/1989 | Gazda | |
| 6,318,457 B1* | 11/2001 | Den Boer | E21B 34/066 166/207 |
| 7,905,286 B2 | 3/2011 | Moody et al. | |
| 8,931,548 B2* | 1/2015 | Partouche | E21B 17/02 166/242.6 |
| 2004/0094303 A1 | 5/2004 | Brockman et al. | |
| 2011/0011580 A1* | 1/2011 | Clark | E21B 33/124 166/244.1 |

(Continued)

OTHER PUBLICATIONS

International Search Report issued in related PCT application PCT/US2015/064416 on Mar. 7, 2016, 3 pages.

*Primary Examiner* — Jermele M Hollington
(74) *Attorney, Agent, or Firm* — Bridget M. Laffey

(57) ABSTRACT

A carrier device is provided for temporary installation downhole in a well. The carrier device is a robust device that is divided by a pressure bulkhead into a first section having an inductive coupler, power electronics, and a telemetry unit, typically all formed using multi-chip-module type electronics, and a second section with at least one test device typically using printed circuit board technology that may include sensors or transducers coupled to a communications bus and/or a power line that extends to the first section via the pressure bulkhead. The carrier further includes a mechanism that permits the carrier to be pulled out of the wellbore, and may include a mechanical locating element, typically adjacent the inductive coupler that permits the carrier to be located in the wellbore so that the inductive coupler will be located adjacent an inductive coupler in, on, or behind a liner or casing of the wellbore.

11 Claims, 7 Drawing Sheets

(56) References Cited

U.S. PATENT DOCUMENTS

2012/0199367 A1 8/2012 Bouldin et al.
2013/0192851 A1* 8/2013 Algeroy .............. E21B 47/122
 166/382
2015/0007650 A1 1/2015 Rose et al.

* cited by examiner

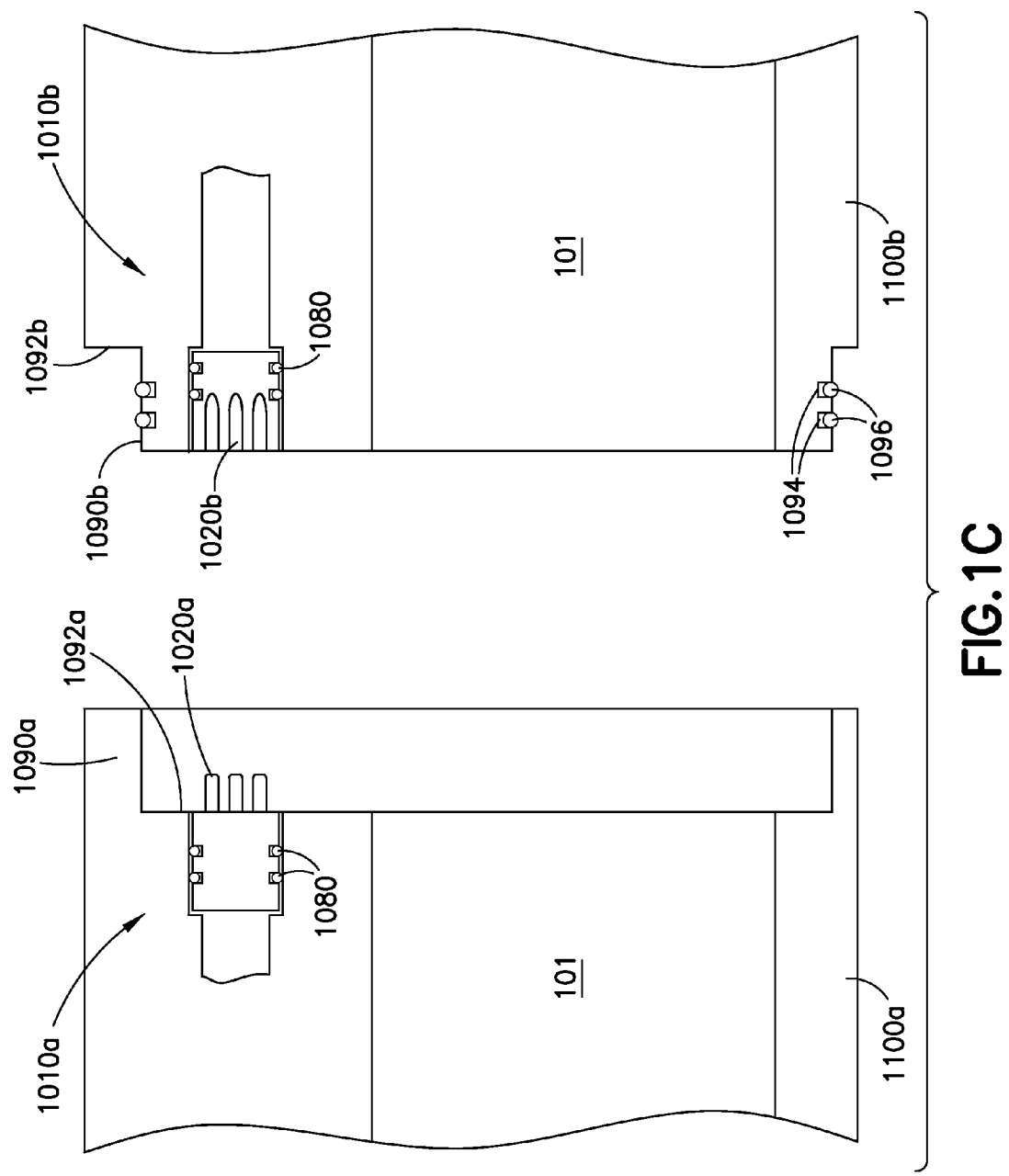

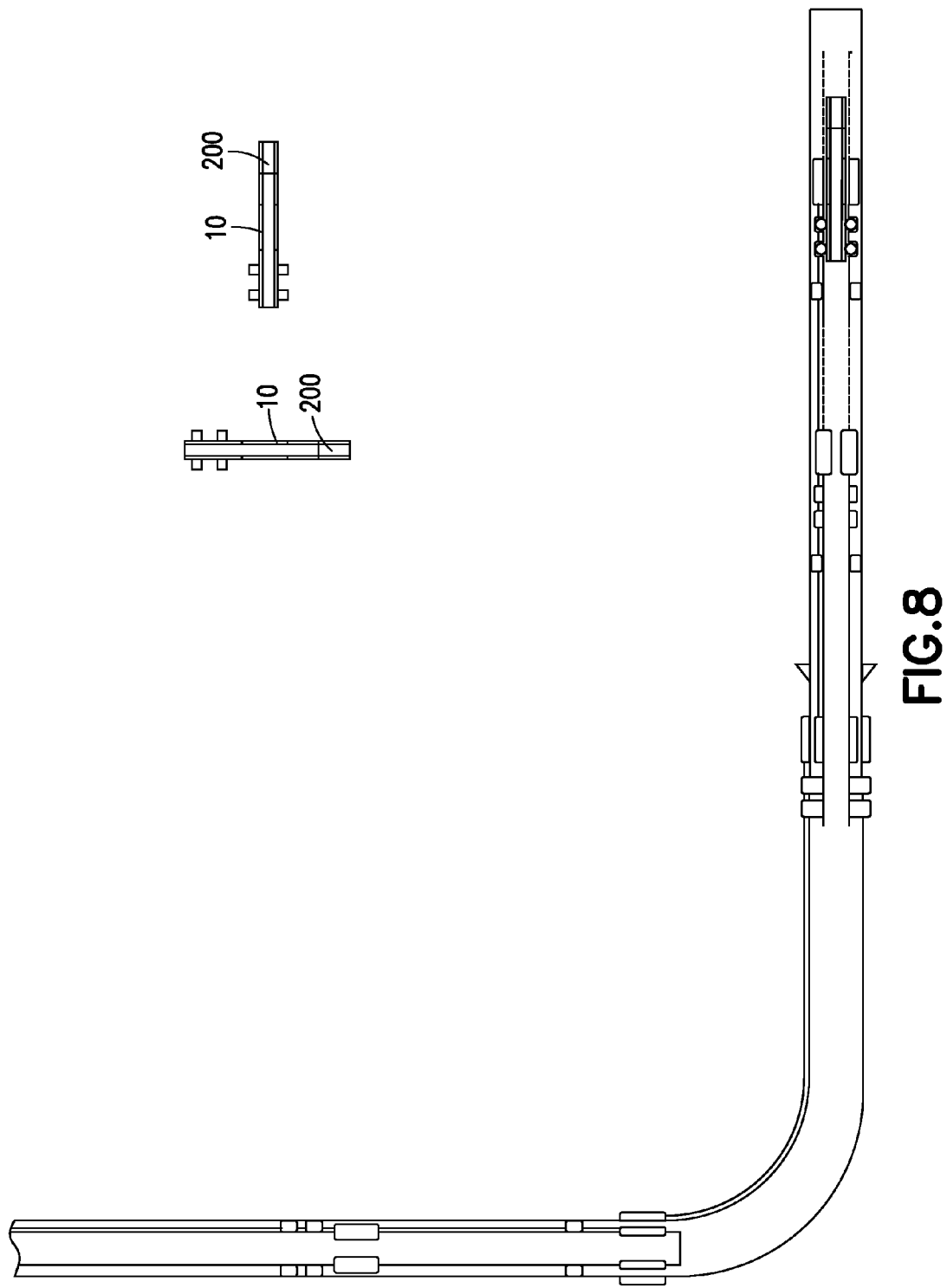

APPARATUS, METHODS AND SYSTEMS FOR DOWNHOLE TESTING OF ELECTRONIC EQUIPMENT

FIELD

The subject disclosure relates to electronic equipment for use downhole in a geological formation. More particularly, the subject disclosure relates to apparatus, methods and systems for the non-permanent deployment of sensors in a wellbore completion. The subject disclosure has particular application to the hydrocarbon industry, although it is not limited thereto.

BACKGROUND

A well can be drilled into a subterranean structure for the purpose of recovering fluids from a reservoir in the subterranean structure. Examples of fluids include hydrocarbons, fresh water, or other fluids. Alternatively, a well can be used for injecting fluids into the subterranean structure.

Once a well is drilled, completion equipment can be installed in the well. Examples of completion equipment include a casing or liner to line a wellbore. Also, flow conduits, flow control devices, and other equipment can be installed to perform production or injection operations.

Historically, completion of a wellbore did not involve installation of electronic equipment. However, starting in the late 1980's or early 1990's it became common to deploy permanent pressure and temperature gauges in a completion. Since the 1990's, other permanent sensors such as array thermal sensors, distributed temperature sensors using fiber optic lines, distributed vibration sensors using fiber optics, and permanent geophones have been deployed, although their use has not been overwhelmingly adopted because of multiple issues. One issue associated with installation associated with deployment of permanent electronic equipment in a completion involves the powering of that equipment. Another issue relates to the lifecycle requirements of that equipment, and the inability or difficulty in retrieving such systems if they fail. In particular, the wellbore is considered to be a harsh environment, and electronic equipment that is part of a completion should be extremely robust because the lifecycle of a completion can extend decades.

In order to overcome at least the equipment powering issues, co-owned U.S. Ser. No. 13/358,569 (U.S. Patent Pub. No. 2013/0192851) to Algeroy et al., which is hereby incorporated by reference in its entirety herein, provides coupler portions along a structure that are communicatively engageable with equipment in the structure. Thus, in accordance with some embodiments of that disclosure, coupler portions can be provided along a well to provide discrete coupling points that can be selectively engaged to equipment for performing electrical communication, hydraulic communication, and/or optical communication. Such coupling points can be considered docking points (or docking stations) for docking or other engagement of a tool that has a component or components that is/are to communicate electrically, hydraulically, and/or optically with other equipment using respective coupler portions. In some implementations, the coupler portions can be inductive coupler portions. In various embodiments, the inductive couplers portions are located on, in, or behind liners, and/or on, in, or behind casing. Inductive coupling involves transfer of a time-changing electromagnetic signal or power that does not rely upon a closed electrical circuit, but instead performs the transfer wirelessly. For example, if a time-changing current is passed through a coil, then a consequence of the time variation is that an electromagnetic field will be generated in the medium surrounding the coil. If a second coil is placed into that electromagnetic field, then a voltage will be generated on that second coil, which is referred to as the induced voltage.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a carrier device is provided that can be installed downhole in a well. The carrier device is a robust device that in one embodiment is effectively divided into two housing sections by a pressure bulkhead. A first housing section includes an inductive coupler, power electronics coupled to the inductive coupler, and a telemetry unit which may include one or more communications chipsets coupled to the power electronics. A second housing section includes one or more test devices (also called "prototypes") that may include sensors or transducers coupled to a communications bus and/or a power line that extends to the first section via the pressure bulkhead. The carrier device further includes a fishing neck or other catch or latch element that permits the carrier to be pulled out of the wellbore. The carrier device may also include a mechanical locating element, typically adjacent the inductive coupler that permits the carrier device to be located in the wellbore so that the inductive coupler will be located adjacent an inductive coupler in, on, or behind a liner or casing of the wellbore.

In one embodiment, the carrier is a multi-chip-module ("MCM") carrier which provides the power to drive the sensors on the prototypes, the electronics to process the signals from the prototypes, and telemetry to send the processed signals uphole to the surface for analysis and use by an operator. In one embodiment, the prototypes are designed and built as PCBs (printed circuit boards) using soldered through-hole or even SMC (surface mount component) electronics, which are faster to design and build and are typically an order of magnitude lower cost than MCM devices. The PCB can then be mechanically packaged to resist the conditions downhole such as pressure or fluid entry. The prototype device can then be connected electrically or logically to a full-fledged MCM to the power bus and/or telecom bus.

In one aspect, the first section of the carrier is multi-functional, allowing multiple "ports" for different sensor types, different power requirements, different communication protocols etc.

In one aspect, the carrier is capable of being run in and pulled out of different well environments with different prototype devices connected to it, thereby allowing the prototype devices to be left in the wellbore downhole environment for extended periods such as weeks, or months, or even years. When the electronics or sensor(s) of the prototype fails, or if the test objectives of the prototype are met, the carrier device with the prototypes can be retrieved from the well and inspected to look for signs of aging or design improvements. The carrier device can then be disconnected and different prototype devices attached and run into another wellbore environment if desired.

In some embodiments, methods are provided by which a prototype with a sensor or other device can be operationally evaluated for an extended period of time in an actual well (or wells) and retrieved for inspection and re-design purposes. The prototype devices can be designed for a short term specific application, in which case, when they perform the required function for the required time, they are retrieved. Alternatively, the devices may be candidates for long term sensors or components of tools which are tested for qualification prior to building "fully qualified" production versions of the tools.

According to one aspect, systems are provided which provide "plug-in points" distributed along the wellbore. These plug-in points allow the carrier device to be powered via an inductive coupling link, and send communications/telemetry through the coupler to the surface via a single electrical cable link. In one aspect, these plug in points are located such that critical locations within the well environment can be tested with the prototype devices. By way of example, plug-in point locations might include one or more of: the entry point of fluids into the well, a location adjacent to fractures in the reservoir, a location downstream of converging flows where turbulence might play a role in the well performance, locations upstream and downstream of chokes or pumps that affect the fluid pressure and flow regimes, a location close to a point at which gas breaks out of solution and/or high corrosion or erosion is observed.

Additional aspects, embodiments, and advantages of the disclosed methods may be understood with reference to the following detailed description taken in conjunction with the provided drawings.

BRIEF DESCRIPTION OF THE DRAWINGS

FIG. 1c is a cross-sectional diagram showing disassembled pressure bulkheads located in a carrier;

FIG. 8 is a diagram of the wellbore of FIG. 7 with the carrier devices and prototypes removed.

DETAILED DESCRIPTION

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice. Furthermore, like reference numbers and designations in the various drawings indicate like elements.

Figure 1:
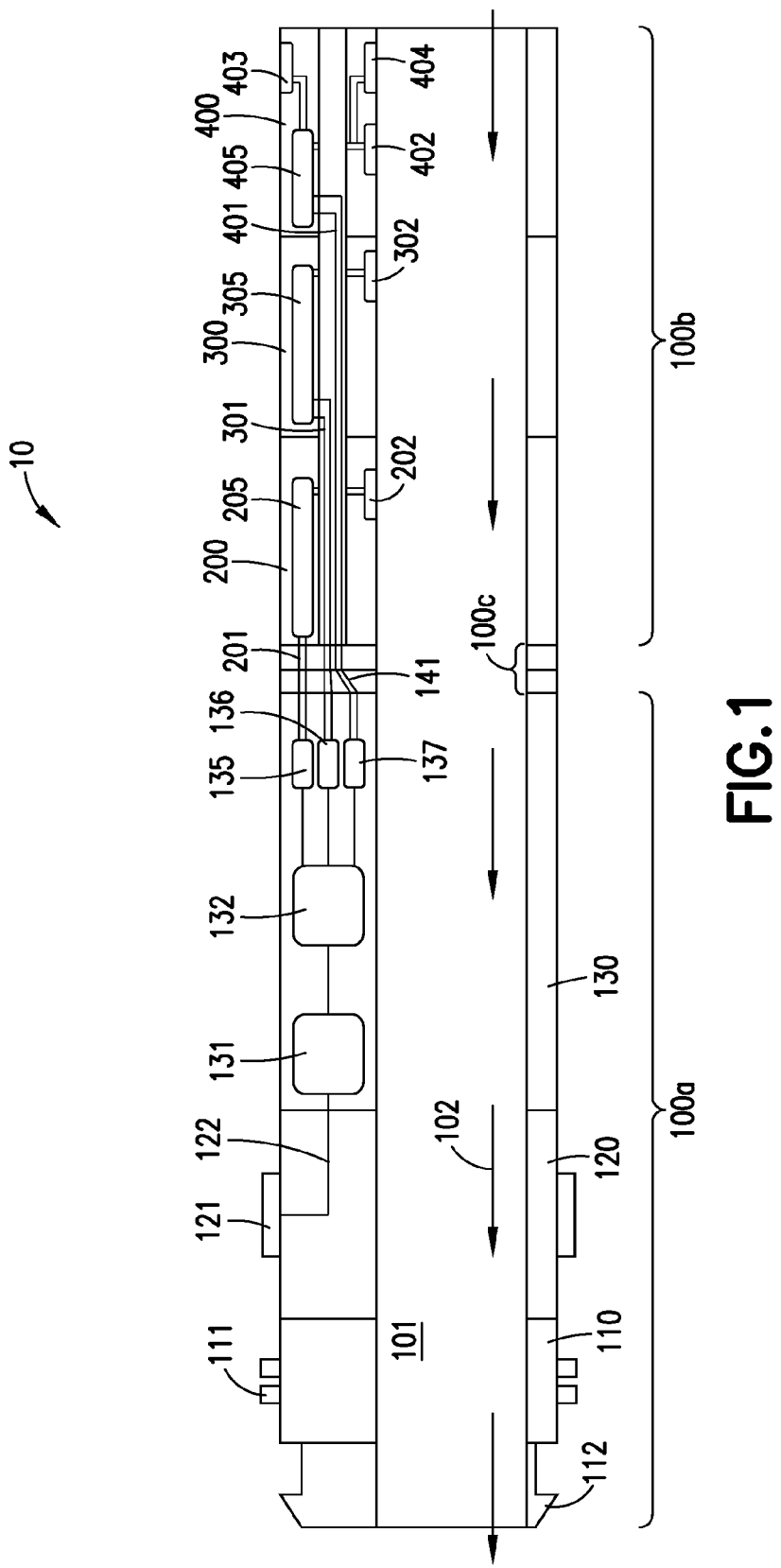
FIG. 1 is a schematic diagram of a carrier complete with a plurality of prototype devices.

Turning to FIG. 1, a "carrier device" 10 is seen that can be installed downhole in a wellbore. The carrier device 10 is a robust device (e.g., capable of withstanding high temperature and high pressure downhole environments for many years) that in one embodiment is effectively divided into two (housing) sections 100a, 100b by a pressure bulkhead 100c which in one embodiment may constitute two separate bulkheads that terminate the respective sections 100a and 100b as described in more detail below. As seen in FIG. 1, housing sections 100a, 100b and pressure bulkhead 100c define a throughbore 101 so that when carrier device 10 is installed in a wellbore, fluid can pass through the carrier device 10 as indicated by arrows 102

The first section 100a of carrier device 10 is provided with a locating cartridge 110 having a mechanical locating system 111, a fishing neck 112 for installation and retrieval, an electrical coupling cartridge 120 having an inductive coupler 121, and an electronics cartridge 130 including power electronics 131 coupled via electrical line (wire) 122 to the inductive coupler 121, and a telemetry unit 132 which may include one or more communications chipsets 135, 136, 137 coupled to the power electronics 131. The second section 100b includes one or more test devices (also called "prototypes") 200, 300, 400 that may include sensors or transducers 202, 302, 402 coupled to one or more communications buses 201, 301, 401 and/or power lines 141 that extend to the first section 100a via communication elements or conductors that extend through the pressure bulkhead 100c. As is described in more detail below, section 100a of the carrier contains all the functionality required to power and communicate with the prototype devices connected to it. In addition, because section 100a contains the electrical inductive coupler 121, section 100a is designed to electrically couple the device to a wellbore inductive coupler such as described by previously referenced U.S. Patent Pub. No. 2013/0192851 to Algeroy et al.

The fishing neck 112 allows the installation and retrieval of carrier 10 using conventional intervention systems such as coiled tubing, tractor, wireline, slickline etc. In one embodiment, the locating mechanism 111 is any conventional lock mechanism used in slickline operations. This lock mechanism allows the carrier 10 to be located in a nipple profile (as described hereinafter) within a wellbore and locked in place. A retrieving tool may be subsequently used to free the lock mechanism by the action of jarring, shifting, or in other known manners.

According to one aspect, the electronics cartridge 130 is designed as a platform for the variety of sensors of the prototypes and is built to be capable of withstanding the wellbore environment for prolonged periods of time—typically a "permanent" electronics lifecycle of at least ten or twenty years at an expected downhole temperature. In one embodiment, the electronics within this cartridge 130 are constructed of MCM (multi-chip-module) type electronics, in which polyamide or epoxy PCB are replaced by ceramic board and components directly used in die form. MCM type electronics is far superior to regular PCB (printed circuit board) in terms of lifecycle under temperature and shock/vibration environments.

The permanent electronics cartridge 130 includes a number of electronic sub-systems such as power electronics 131, a telemetry module 132, and the communications chipsets 135, 136, 137. The power electronics 131 convert the power signals from (and to) the inductive coupler 121 and power the electronic boards within carrier 10. The telemetry module 132 converts communication signals from the inductive coupler 121 to and from the sensors 202, 302, 402 of the prototype units 200, 300, 400. The communications chipsets 135, 136, 137, in one embodiment, are standardized communications protocol chipsets that provide standardized data communications and power protocols to the prototype devices. Examples of typical communications hardware layers include but are not restricted to SPI, RS232, and RS485. In one embodiment, a synchronous telecommunications protocol is utilized. In another embodiment, an asynchronous protocol is utilized. In other embodiments, the communication protocol includes an industry standard protocol such as Modbus, Profibus, etc. In other embodiments, custom protocols may be utilized. Regardless, in one embodiment, the communications chipsets ae constructed as MCM compatible high temperature electronics.

In one embodiment, a communication chipset (e.g., 135, 136, 137) is provided for communication with a single prototype 200, 300, 400 via separate communications buses 201, 301, 401. Each chipset and communications bus may utilize a different telecommunications protocol, or all three may utilize the same protocol. In another embodiment, a single communications bus may be utilized with multiple prototypes and multiple chipsets coupled to the single communications bus.

In one embodiment, multiple power lines 141 are provided between the chipsets of section 100*a* and the prototypes of section 100*b*; i.e., power is transmitted via the bulkhead(s) 100*c*. In another embodiment, a single power line is provided via the bulkhead(s) 100*c* to power the chipsets and the prototypes. In one embodiment, the power line 141 and the communications bus(es) may be integrated such that communications are modulated on the power line.

Turning now to FIGS. 1, 1*a* 1*b* and 1*c*, as previously mentioned, the pressure bulkhead section 100*c* is provided to segregate the permanent electronics cartridge 130 from the prototype electronics cartridges 200, 300 or 400. More particularly, in one embodiment, the permanent electronics cartridge 130 may be assembled by assembling components of the cartridge and locating them inside a metal housing of section 100*a* (such as housing 1100*a* in FIG. 1*c*) and the components of the prototypes may be assembled and located inside a metal housing of section 100*b* (such as housing 1100*b* in FIG. 1*c*) that provides protection for the components. The ends of the metal housing are sealed with a bulkhead element such as bulkheads 1010*a* and 1010*b* of FIG. 1*c* which form part of the bulkhead 100*c* as well as the end of each module. The bulkheads are welded, and/or are provided with metal to metal seals or ring seals (such as ring seals 1080 located in grooves 1050) to ensure that there is no potential fluid (or gas) leak path.

Figure 1A:
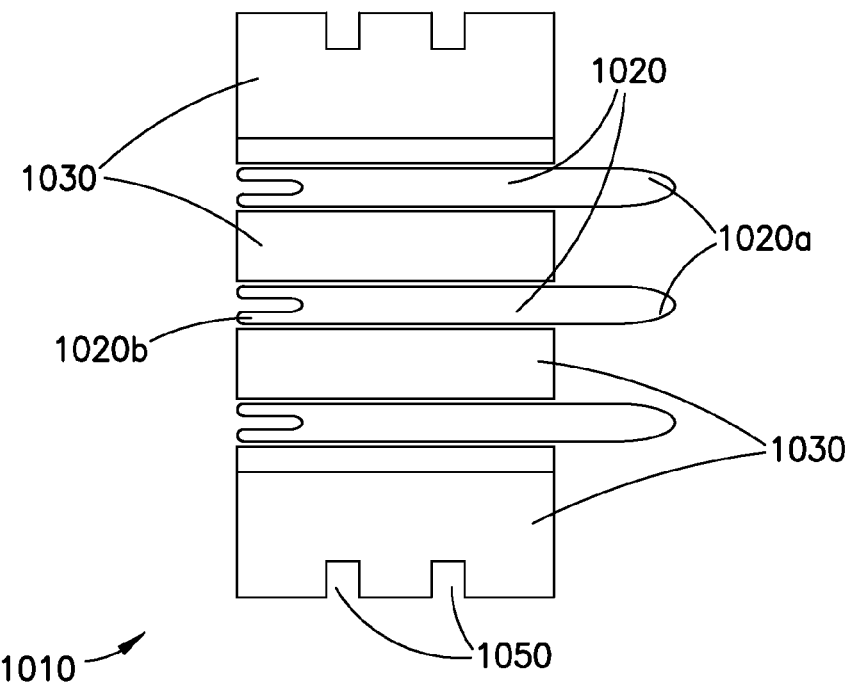
FIG. 1a is a detailed diagram of a pressure bulkhead.

One embodiment of a bulkhead 1010 is seen in FIG. 1*a*. Bulkhead 1010 is made up of a number of metal rods or feedthroughs 1020 (three shown) that provide electrical connection between the two sides of the bulkhead. Each rod may be made of a piece of solid metal with one end presenting a male pin 1020*a*, and the other end presenting a female receptor 1020*b* for a male pin (e.g., from another bulkhead as seen in FIG. 1*c* or from pin connectors in the module). The number of rods 1020 provided depends upon the tool requirements. The rods are spaced from each other to ensure that electrical signals are not shorted from one rod to the next. The space between the rods is filled with an insulating material 1030 such as glass, ceramic, epoxy, or plastic, which, during manufacture, is caused to bind to the metal rods 1020 in known manners. One or more circumferential grooves 1050 may be provided on the bulkhead 1010 for receiving o-rings 1080 (FIG. 1*c*) or other sealing elements so that the bulkhead will seat securely in the housing section and prevent fluid from penetrating the housing section.

In one aspect, the length of the rods 1020 and the thickness of the insulating material 1030 are chosen so that the bulkhead 1010 will withstand a desired pressure difference.

Figure 1B:
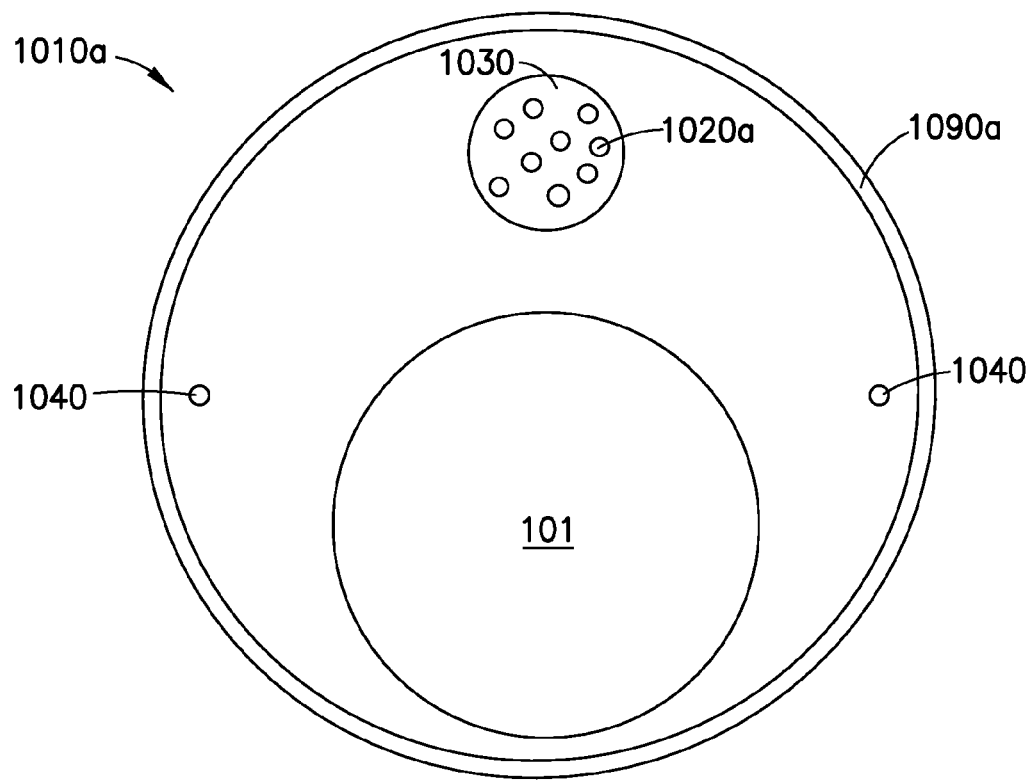
FIG. 1b is a front view of a pressure bulkhead located in a carrier.

As seen in FIG. 1*b*, the housings are provided with blind alignment holes 1040. The blind alignment holes 1040 are provided such that a dowel pin can be inserted and form a bridge between the housings at a the time of installation. If desired, in one embodiment, rather than locating the blind alignment holes as shown in FIG. 1*b*, the blind alignment holes 1040 may be located in the insulating material 1030 of the bulkheads. These holes are made assymetric so that the bulkheads can be inserted in only one specific orientation to ensure multiple pins carrying electrical signal for different functions do not cross when the bulkheads are mated.

Turning to FIG. 1*c*, two housings 1100*a* and 1100*b* with bulkheads 1010*a*, 1010*b* are shown prepared to mate. The two housings are from two of the components in FIG. 1 such as 200, 300, 400, etc., which forms section 100*b* or any of the components that make up section 100*a*. Housing 1100*b* is shown terminating in a circumferential male component 1090*b* which defines a shoulder 1092*b*, and housing 1100*a* is shown terminating in a ring 1090*a* that extends from shoulder 1092*a*. As will be appreciated, component 1090*b* seats inside ring 1090*a* such that the end of component 1090*b* rests on shoulder 1092*a*, and the end of ring 1090*a* rests on shoulder 1092*b*. Each housing is equipped with a bulkhead 1010 which can make electrical connection once the two housings are in close proximity of each other (e.g., mate). These bulkheads 1010 are located in their own compartment and form a seal to the housing using seals 1080 in the grooves 1050. The male component 1090*b* of housing 1100*b* is also equipped with two grooves 1094 which are similar to the grooves 1050 and receive additional o-rings 1095 that act to seal the two housings together when component 1090*b* seats inside ring 1090*a*. Accordingly, and in accord with one aspect, the mating components 1090*a*, 1092*a*, 1090*b*, and 1092*b* may be considered to constitute part of the bulkhead(s) 100*c*. For mechanical integrity another piece of housing can slide over the joint (not shown) or any other fastening approach can be used. When the housings mate, the respective pins 1020 on the respective bulkheads mate with each other, and since the pins are connected inside the housing to relevant electrical component, the components are placed in electrical connection with each other.

In one aspect, the housings and bulkheads are arranged such that a path 101 is provided for the fluid to pass through.

In one embodiment, the pins 1020 of bulkhead 1010*a* are coupled to communications chipsets 135, 136, 137 either by direct contact to an output pad of the MCM or by conductors (not shown) that extend from the MCM to the pins. Seals 1080 in grooves 1050 cause bulkhead 1010 to isolate segment 100*a* of the carrier device 10. It will be appreciated that if segment 100*b* of the carrier device is similarly provided with a bulkhead 1010*b* (as is suggested by FIG. 1*c*) with female portions 1020*b* of pins 1020 directed outwardly and male portions 1020*b* coupled to buses 201, 301, 401, the respective bulkheads will contact each other with the male portions 1020*a* of the pins of the bulkhead of segment 100*a* mating and making electrical contact with the female portions 1020*b* of the pins of bulkhead 1010 of segment 100*b*.

As shown in FIG. 1, and according to one embodiment, each prototype transducer cartridges 200, 300, 400 incorporates respective communications buses 201, 301 and 401, respective sensors, transducers or other type of devices 202, 302, 402, 403, 404, and respective processing modules 205, 305, 405. As shown in FIG. 1, multiple sensors, transducers or devices may be associated with a given prototype cartridge, and they may be located on the borehole side (as is sensor 403) or on the through-bore side (as are sensors 202, 302, 402 and 404) of the prototype. Any number of transducers or devices could be incorporated in a given prototype and connected to the electronics cartridge 130 via the pressure bulkhead(s) 100c, to function in any manner desired. In one embodiment, the prototypes are designed and built as PCBs (printed circuit boards) using soldered through-hole or even SMC (surface mount component) electronics, which are faster to design and build and are typically an order of magnitude lower cost than MCM devices. The PCB can then be mechanically packaged to resist the conditions downhole such as pressure or fluid entry.

Sensors, transducers and devices of the prototypes may include, but are not limited to: sensing devices, such as electro-chemical, electrical, pressure, temperature, acoustic, vibration, strain, flow rate, microwave, doppler, optical, phase fraction, water or gas hold-up meter, array of such sensors, etc.; transmitters such as electrical, pressure, thermal, acoustic, microwave; sampling devices such as downhole fluid sample chamber and control valves to capture samples; flow control devices such as electric flow metering valves, electro-hydraulic actuated valves, open-close valves; and electrically controlled trace chemical injection valves. By way of example, and not by way of limitation, a chemical sensor may be used to detect carbon-dioxide arrival in a wellbore in a carbon-dioxide flood. As will be appreciated, to package this type of sensor for permanent installation in a downhole completion would typically require at least three to five years of development of MCM (multi-chip-module) design, verification and validation (including shock, vibration, and thermal cycling testing, etc), as well as chemical sensing tests, and corrosion tests. Even then, if the sensor were permanently installed in the completion, there could be no guarantee after a few years that the sensor would be sufficiently robust to perform appropriately. Also by way of example, and not by way of limitation, devices such as trace chemical injection systems or sampling devices would necessarily have a finite lifetime and require retrieval to extract or replenish any of the fluids stored within the device.

As previously mentioned, each prototype cartridge 200, 300, 400 includes a processing module 205, 305, 405, for processing the signals from the sensors, transducers, or electronic devices, and sending them through the communication bus(es) 201, 301 or 401 to the communications chipsets of section 100a of the carrier 10. The processing module may contain any advanced digitization, reference clock signals, plus any firmware or memory required to appropriately handle the signals from the onboard devices and communicate with the relevant communication chipset.

It should be appreciated that the term "processor" or "processing module" as used herein should not be construed to limit the embodiments disclosed herein to any particular device type or system. The processor may include a system or may be a stand-alone microprocessor, microcontroller, digital signal processor, or general purpose computer adapted to execute desired functions, methods and processes. The system may incorporate more than one processor, controller or computer, and in addition, or alternatively, may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The processors or systems may further implement or may be implemented as computer program logic for use with a computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor.

According to one aspect, the carrier 10 may be installed into a wellbore with one or more prototype electronic devices for relatively short periods of time, e.g., weeks, months or even several years and should obtain its power (e.g., through the inductive coupler 121) and communicate (e.g., through the inductive coupler 121) via the wellbore completion. FIGS. 2 through 8 describe certain well architecture components that enable the carrier 10 with the prototypes to be installed at a later date and obtain power and communicate via the wellbore.

Figure 2:
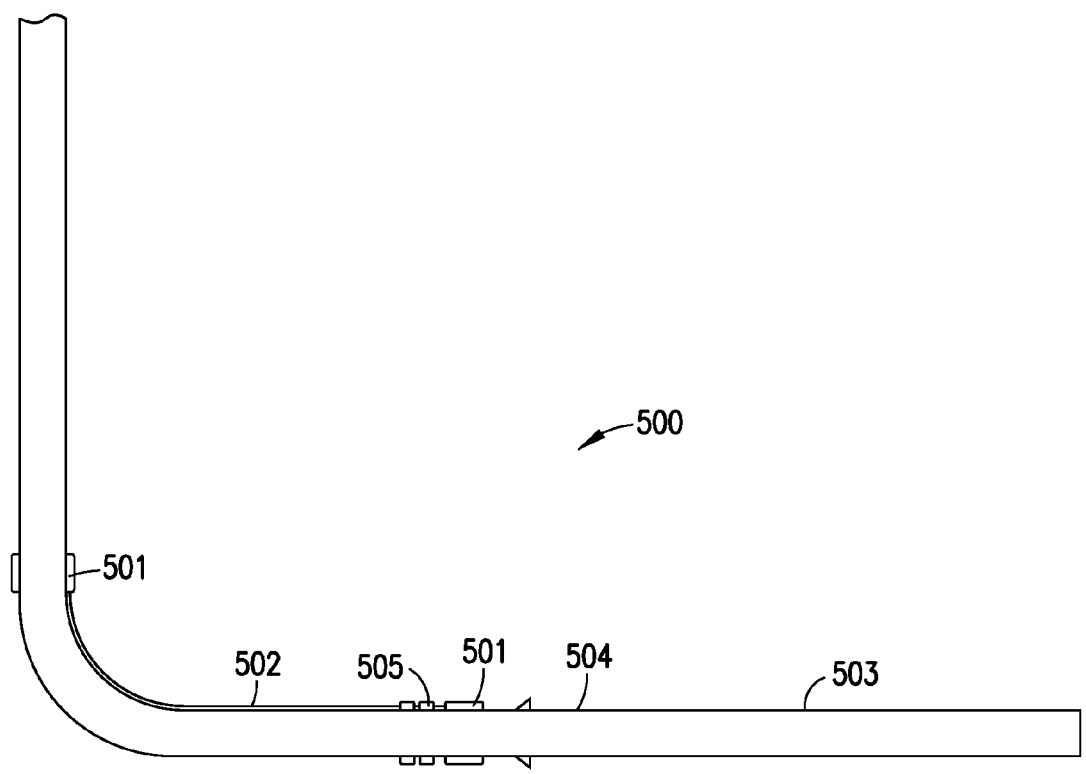
FIG. 2 is a diagram of a basic well architecture ready for completion.

FIG. 2 is a diagram of a basic wellbore architecture 500. A casing string or a casing and liner 504 is run to the depth required and cemented, or otherwise set in the well. A section of well 503 is drilled into the formation and left open hole or otherwise completed with a "sandface completion" (e.g., screen, perforated liner, cemented liner, etc). A series of inductive couplers 501 connected with a behind-the-casing umbilical 502 are run with the casing and cemented or otherwise set in the hole. A landing nipple 505 is located above or below one or more of the couplers 501 as a location device. The inductive couplers 501 may be coupled to a power source uphole (not shown).

Figure 3:
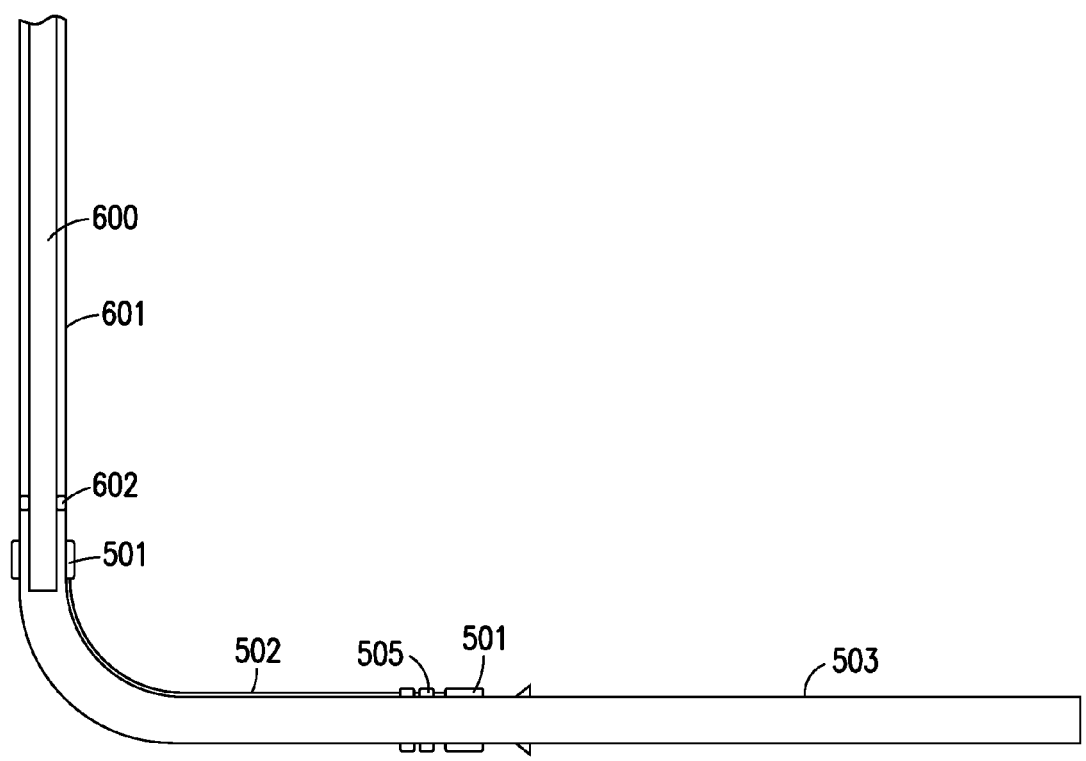
FIG. 3 is a diagram of an embodiment of a wellbore architecture.

FIG. 3 illustrates a temporary basic upper completion 600. If the previously described carrier 10 is not required at the outset of the life of the well, a simple initial completion can be installed such as completion 600 where a basic tubing completion 601 is provided with a production packer 602.

Figure 4:
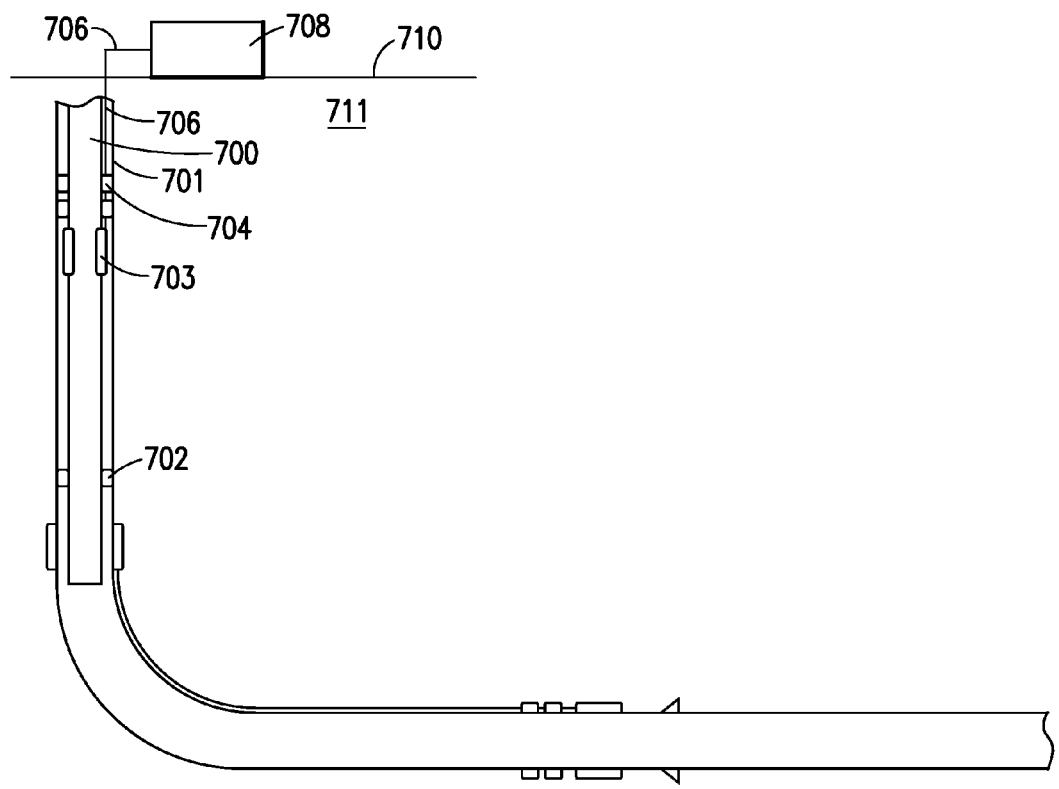
FIG. 4 is a diagram of a tubing string installed in a wellbore.

FIG. 4 is a diagram of a tubing string 700 installed with electrical connections and a female inductive coupler, that allows a carrier device to be later installed into the tubing. More particularly, when the service life of the initial completion is finished, the initial completion can be retrieved and a completion 700 compatible with one or more carrier device such as carrier device 10 may be installed instead. Completion 700 includes a tubing 701, a female inductive coupler 703, connected with an electrical umbilical 706 clamped to the outside of the tubing, and locating nipples 704 that are located at places where it is intended to install one of the carrier devices 10. The female inductive coupler 703 is not activated at this point. It is simply placed at the appropriate location for later insertion of an electrically operated device as required. As shown in FIG. 4, the electrical umbilical 706 may extend uphole to a surface control and power unit 708 on the surface 710 or a formation 711. The surface control unit 708 can include a computer and/or a power supply.

Figure 5:
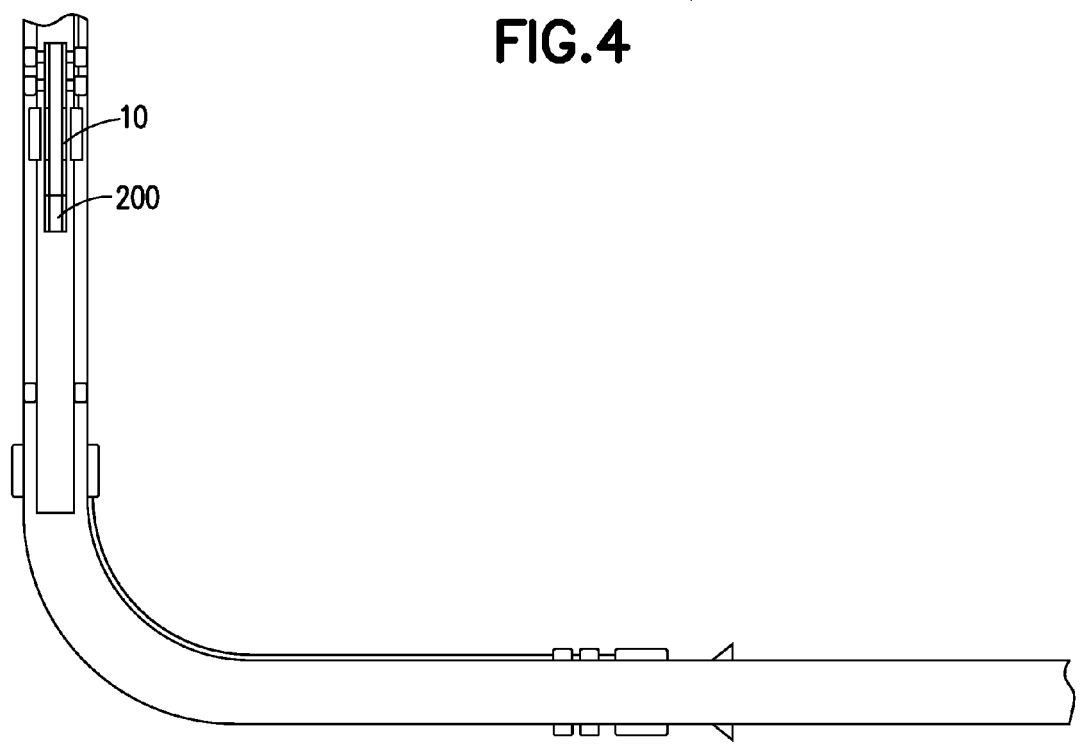
FIG. 5 is diagram of a carrier with at least one prototype installed in the tubing string of FIG. 4.

FIG. 5 illustrates a carrier device 10 with prototype 200 installed in upper completion landing location of the completion 700 of FIG. 4. In this example, the locating system 111 of locating cartridge 110 of the carrier 10 is landed in the locating nipple 704 of the completion. The inductive coupler 121 of carrier 10 is in communication with the upper inductive coupler 703 of completion 700, thereby permitting carrier 10 to obtain power from uphole as well as to communicate signals to and from prototype 200, thereby allowing data to be exchanged and command messages to be sent to the device 200. The carrier 10 can be run using any intervention device, including but not limited to coiled tubing, wireline, slickline, tractor conveyed or even pumped into hole by pumping fluids.

Figure 6:
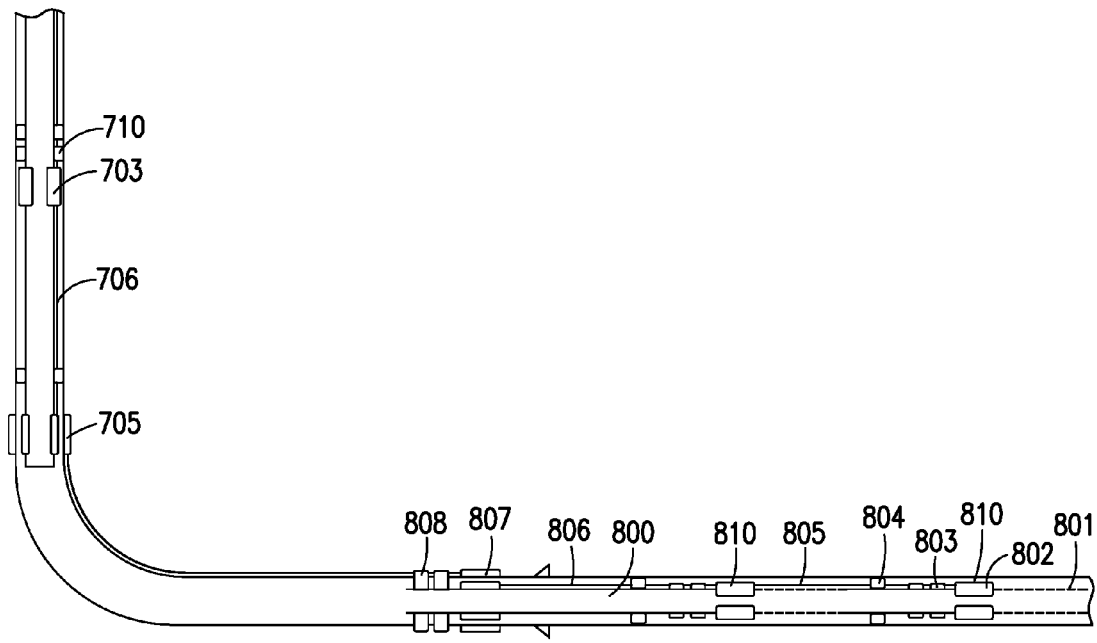
FIG. 6 is a diagram of a retrofit subsystem located in a wellbore.

Turning to FIG. 6, a retrofit subsystem 800 is run and installed into the lower section of a wellbore 503 (as in FIG. 2) which allows more landing locations for carriers at later date. This system can be installed while replacing the upper completion 600 or 700 with the rig. Alternatively, a through-tubing version is designed that allows this system to be run through the upper completion tubulars 700 (FIG. 4) and still land in the lower completion to provide locations 803 for additional carrier devices. The system allows a type of "retrofit" completion to be run as and when the well demands it. Any number of repeating inductive couplers 802, connected with a behind-tubing electrical umbilical 805 and locating nipples 803 can be run on this system, each of which can accept a carrier device 106. Each female inductive coupler 703, 705, 501, 802 can be paired with either a male inductive coupler 705, 807 or a slotted sleeve 710, 810 to reduce electromagnetic power losses in the inductive coupler circuit. These sleeves can be temporary and designed to be removed or shifted when a male coupler or other device is installed. In addition, isolation packers 804 can be installed to hydraulically isolate different intervals within the lower section of the wellbore 503.

Figure 7:
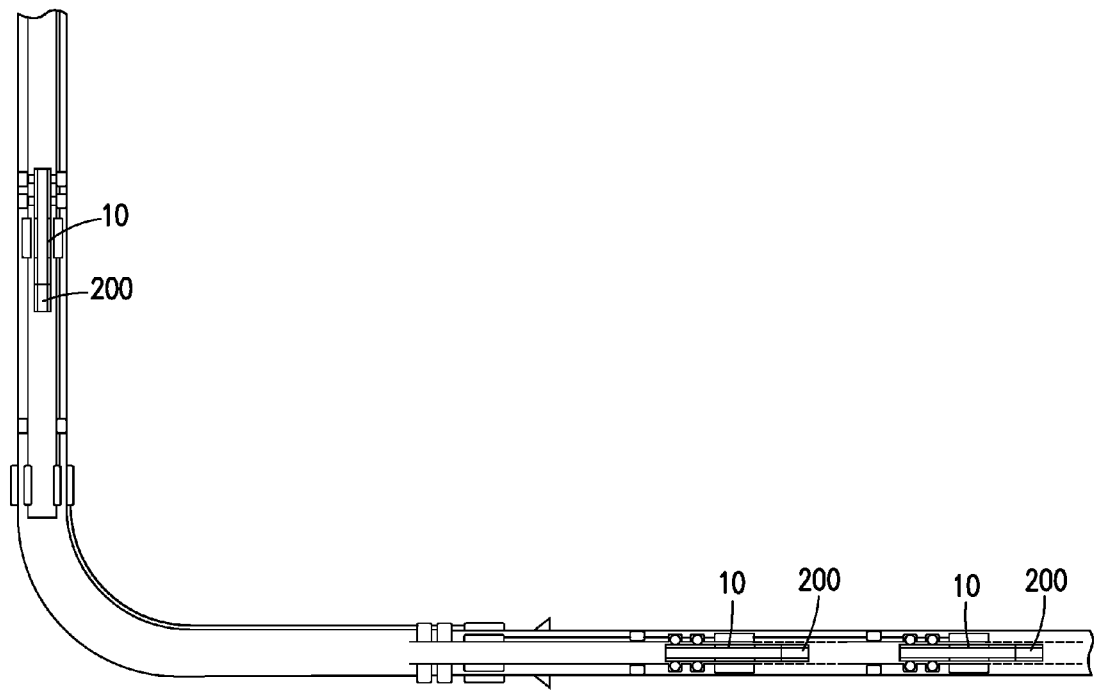
FIG. 7 is a diagram showing carrier devices with prototypes located in multiple locations of a wellbore.

FIG. 7 shows multiple carrier devices 10 installed in the well of FIG. 6. With the inclusion of both an upper completion 700 and a retrofit completion 800 in the well, any number of carrier devices can be installed and landed in the various separately keyed locating nipples. The carrier devices can function independently of each other, each being powered by the inductive coupling system and communicating with the surface through the same system. Each of the devices can carry different types of prototypes to perform specific actions, such as, by way of example and not by way of limitation, sensing chemicals downhole, injecting tracers into the flow stream, taking fluid samples, and measuring flow rate and phase fraction.

In one embodiment the injection and detection are performed using the same carrier 10. In another embodiment injection is performed by the cartridge in one carrier 10 while the detection is performed on another carrier which may be located downstream or upstream from the injection.

As seen in FIG. 8, these carrier devices 10 can be run or retrieved at any time during the well's life for refurbishment, repair, failure investigation or other such action. If the carrier sections 10 are of the same size, it may be required to remove any carriers 10 above the carrier 10 that is being removed, to allow the passage. In another embodiment the carriers are of different sizes and the carriers designed for lower points are made to be able to pass through previous (higher) carrier(s) so that removing a particular carrier will not require removing any other one.

In one embodiment, the slotted sleeves 710, 810 are removed prior to installation of the carrier devices 10, and can be replaced if a carrier device is removed.

In one embodiment, a carrier device 10 (e.g., a MCM carrier) with a prototype (e.g., designed and built using PCBs) and having at least one sensor is located downhole in a wellbore for an extended period of time such as weeks, or months, or even years. The carrier device 10 includes and is powered via an inductive coupling link with circuitry located along the wellbore (e.g., at a plug-in point), and may communicate with the surface through the coupler. In this manner, the prototype and/or sensor may be operationally evaluated (e.g., signals from the prototype are monitored by uphole equipment) for an extended period of time (which for purposes herein, means a matter of at least weeks, and possibly months or years). When the electronics or sensor(s) of the prototype fails (e.g., as determined at the surface), or if the test objectives of the prototype are met, the carrier device with the prototypes is retrieved from the well and brought to the surface. The prototype may be disconnected from the carrier and inspected to look for signs of aging or design improvements. The disconnected carrier device can then be fit with different prototype devices and run into another wellbore environment, if desired.

Although only certain examples have been described in detail above, those skilled in the art will readily appreciate that many modifications are possible in the examples without materially departing from this subject disclosure. Thus, by way of example, while a particular bulkhead was described for the carrier device, it will be appreciated that other bulkheads could be utilized provided the bulkhead(s) permit communication and/or power to be transferred via the bulkhead(s) from one section of the carrier device to another section and do not block a fluid path through the carrier device. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A carrier device for use in a wellbore completion, comprising:
   a first section including an inductive coupler, power electronics coupled to the inductive coupler, and a telemetry unit, coupled to the power electronics and including at least one communications chipset;
   a second section including at least one test device said at least one test device includes a processor and at least one of a sensor and a transducer;
   and
   at least one pressure bulkhead coupled to and dividing said first section and said second section, wherein said at least one test device is coupled to at least one of a communications bus, and a power line that extends to said first section via said at least one pressure bulkhead, and
   said first section, said second section, and said at least one pressure bulkhead define a fluid flow path.

2. A carrier device according to claim 1, further comprising:
   a coupling element adapted to permit said carrier device to be pulled out of the wellbore completion.

3. A carrier device according to claim 2, wherein:
   said coupling element is a fishing neck.

4. A carrier device according to claim 1, wherein:
said first section further includes a mechanical locating element.

5. A carrier device according to claim 4, wherein:
said mechanical locating element is adjacent said inductive coupler.

6. A carrier device according to claim 1, wherein:
said inductive coupler, power electronics and said telemetry unit comprise multi-chip-module type electronics, and
said at least one test device comprises printed circuit board type electronics.

7. A carrier device according to claim 1, wherein:
said at least one communications chipset and said at least one test device communicate via said communications bus according to a standardized communications protocol.

8. A carrier device according to claim 1, wherein:
said at least one of said sensor and said transducer communicates with said fluid flow path.

9. A carrier device according to claim 1, wherein:
said at least one test device includes a plurality of test devices.

10. A carrier device according to claim 1, wherein:
said at least one pressure bulkhead includes at least one pin coupled to said at least one of said communications bus and said power line, said at least one pin for causing said at least one of said communications bus and said power line to extend to said first section.

11. A carrier device according to claim 1, wherein:
said at least one pressure bulkhead includes a first pressure bulkhead at an end of said first section and a second pressure bulkhead at an end of said second section, said first pressure bulkhead contacting said second pressure bulkhead.

* * * * *